United States Patent
Chen et al.

(10) Patent No.: US 8,683,532 B2
(45) Date of Patent: Mar. 25, 2014

(54) SPACE-SHIFTING MEDIA STREAMING SYSTEM

(75) Inventors: Yen-Fu Chen, Austin, TX (US); John Hans Handy-Bosma, Cedar Park, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1706 days.

(21) Appl. No.: 11/289,095

(22) Filed: Nov. 29, 2005

(65) Prior Publication Data

US 2007/0124761 A1 May 31, 2007

(51) Int. Cl.
*H04N 7/18* (2006.01)
*H04N 7/173* (2011.01)

(52) U.S. Cl.
USPC .............. 725/80; 725/74; 725/78; 725/89

(58) Field of Classification Search
USPC ................... 725/1–153; 386/1–131
See application file for complete search history.

(56) References Cited

U.S. PATENT DOCUMENTS

| | | | |
|---|---|---|---|
| 5,818,439 A | 10/1998 | Nagasaka et al. | |
| 6,049,831 A * | 4/2000 | Gardell et al. | 709/236 |
| 6,072,983 A | 6/2000 | Klosterman | |
| 6,530,083 B1 * | 3/2003 | Liebenow | 725/46 |
| 6,681,396 B1 | 1/2004 | Bates et al. | |
| 6,850,286 B2 | 2/2005 | Burghard | |
| 7,415,310 B2 * | 8/2008 | Bovee et al. | 700/9 |
| 2002/0174430 A1 * | 11/2002 | Ellis et al. | 725/46 |
| 2003/0107675 A1 * | 6/2003 | Dew et al. | 348/553 |
| 2004/0244061 A1 * | 12/2004 | Okuyama et al. | 725/142 |
| 2005/0076127 A1 * | 4/2005 | Wilson et al. | 709/227 |
| 2005/0097623 A1 * | 5/2005 | Tecot et al. | 725/136 |
| 2005/0246622 A1 * | 11/2005 | Ahn et al. | 715/500.1 |
| 2005/0246738 A1 * | 11/2005 | Lockett et al. | 725/43 |
| 2006/0271993 A1 * | 11/2006 | Nakata et al. | 725/131 |

FOREIGN PATENT DOCUMENTS

CN 1574934 A 2/2005

OTHER PUBLICATIONS

ReplayTV 5500 User's Guide, 2003, Digital Networks North America, Inc., p. 48.*

* cited by examiner

*Primary Examiner* — Dominic D Saltarelli
(74) *Attorney, Agent, or Firm* — Yee & Associates, P.C.; Arthur J. Samodovitz

(57) ABSTRACT

A system for space-shifting media broadcasts is provided. A request to space-shift a media broadcast is received. A device, out of a network of devices is selected to space-shift the media broadcast to. The media broadcast is then space-shifted to the selected device.

13 Claims, 2 Drawing Sheets

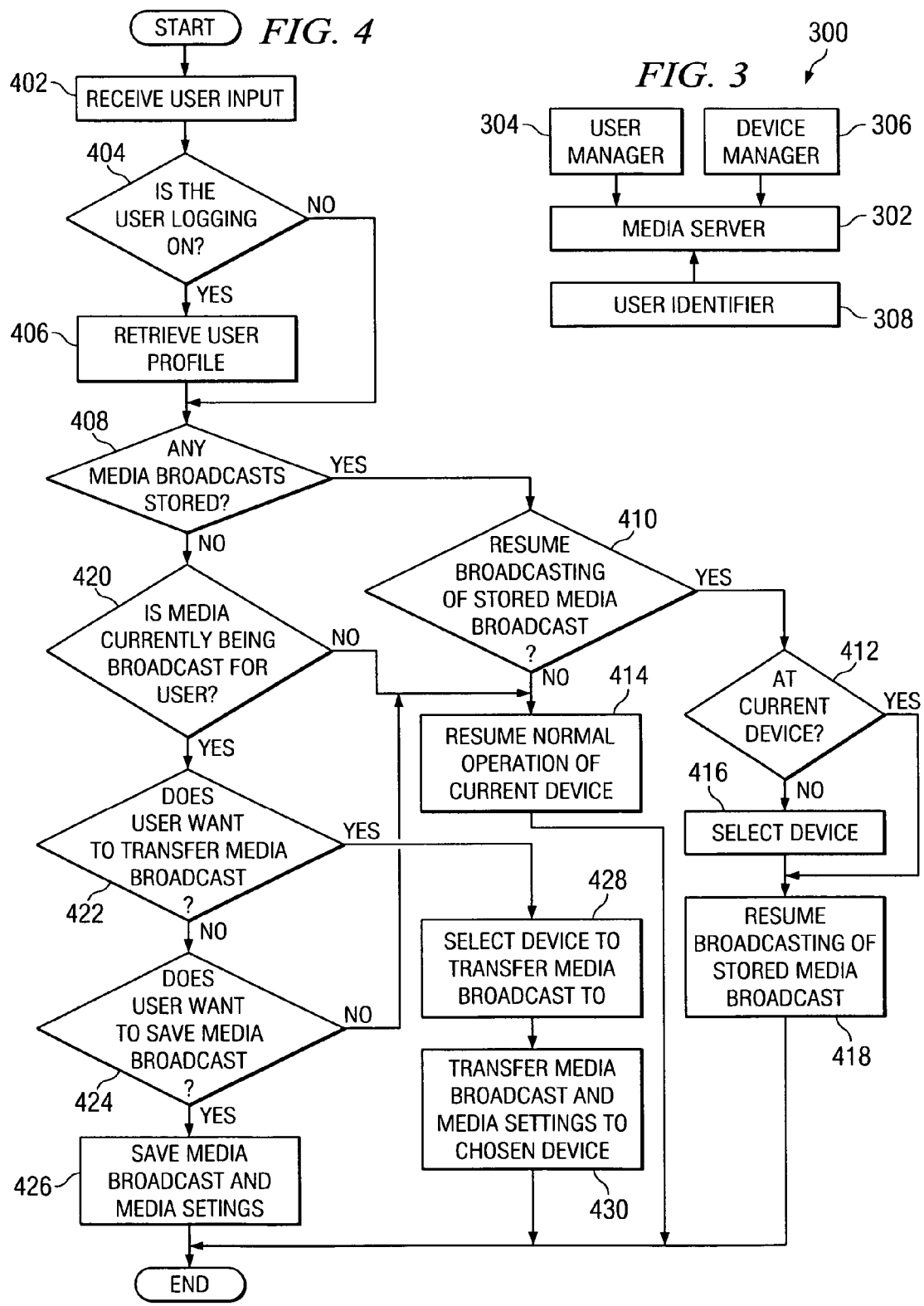

SPACE-SHIFTING MEDIA STREAMING SYSTEM

BACKGROUND OF THE INVENTION

1. Field of the Invention

The present invention relates generally to media broadcasts and, in particular, to a method, system, and computer program product for space-shifting media.

2. Description of the Related Art

Two lucrative and ubiquitous entertainment technologies are time-shifting and space-shifting features. Time-shifting means changing when someone will watch a media broadcast. TiVo and VCRs are popular time-shifting devices. Space-shifting means changing where someone will watch a media broadcast. Media center devices that stream media from a computer to a television in another room, or which copy audio/video to a hand-held device are examples of space-shifting. Time-shifting and space-shifting can be used in combination or in exclusion of each other. Media encompasses many forms of broadcast material including, television and high-definition television broadcasts, radio and audio broadcasts, web casts, streaming video, etc.

One challenge with technologies that employ real-time space-shifting, such as, for example, streaming from one device to another, is moving locations. With current technology, if a person is watching a movie streamed over his/her home network from the upstairs computer to the downstairs television, via a media center hub, and another, second, person wants him/her to watch the movie on the television in an upstairs bedroom, there are inconvenient steps that have to be performed. The steps comprise: 1) changing the downstairs television to whatever media the second person desires to watch, 2) either the first person or another person needs go to the other device location, turn everything on and go through the media center menus to select the movie that the first person was watching, 3) and then fast forward or skip to wherever the first person left off watching the movie, or close to it at least. There are additional steps if the second person had been watching something on another device that he/she now wants to switch to the downstairs television.

SUMMARY OF THE INVENTION

The present invention provides a method, system, and computer program product for space-shifting media broadcasts. A request to space-shift a media broadcast is received. A device, out of a network of devices is selected to space-shift the media broadcast to. The media broadcast is then space-shifted to the selected device.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram depicting a system for space-shifting media in accordance with an exemplary embodiment of the present invention; and FIG. 4 is flowchart illustrating the operation of space-shifting of media, in accordance with an exemplary embodiment of the present invention.

DETAILED DESCRIPTION OF THE PREFERRED EMBODIMENT

Figure 1:
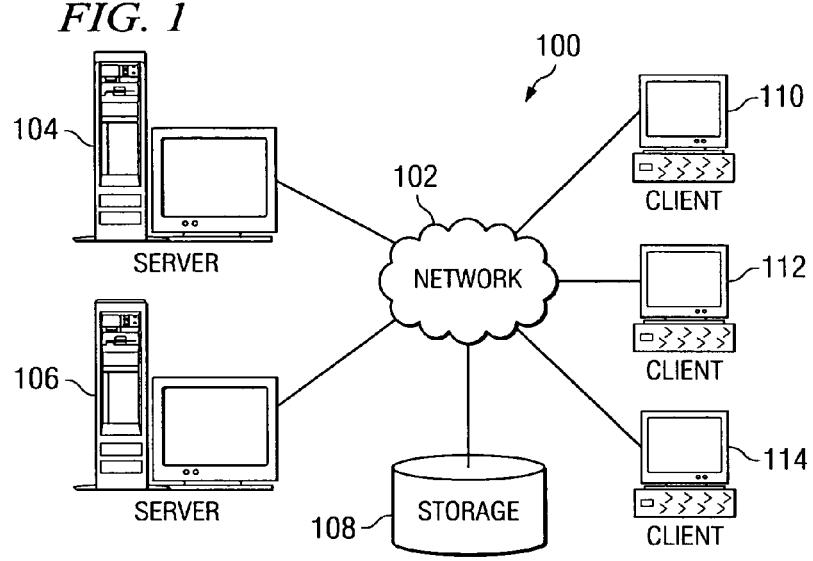
FIG. 1 is a pictorial representation of a network of data processing systems in which exemplary aspects of the present invention may be implemented.
Figure 2:
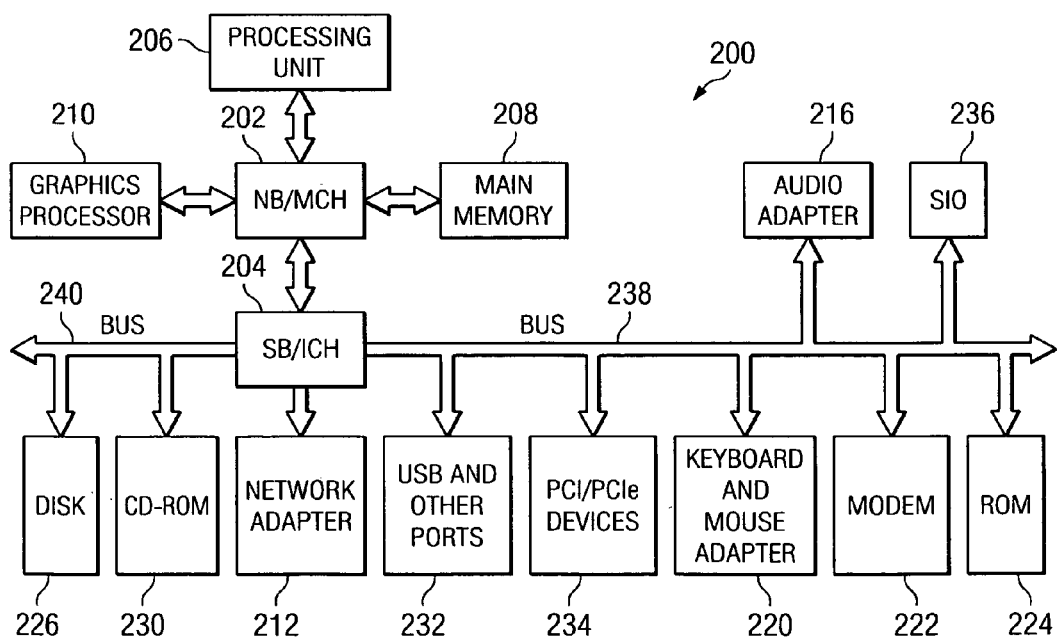
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

In an exemplary embodiment, the present invention remembers what media and devices various individuals are currently viewing or hearing and allows the various individuals to space-shift that media and its settings to any other device such that an individual may pick up where the individual left off, in terms of viewing or hearing, with the minimum of effort. A device means any tangible device capable of creating, broadcasting, receiving, transmitting, or reproducing a media signal, such as, for example, but not limited to, televisions, radios, compact disk players, data processing systems, DVD players, etc.

In another exemplary embodiment the present invention provides a remote control device that has individual buttons that can be mapped to individuals in the family or other group who share devices, such as, for example, 4 buttons for a family of four, or other such mechanism where family members can quickly identify themselves to a device. So when an individual presses their button, the current device commences with the media that individual was last viewing or hearing. In a further exemplary embodiment, each individual may have multiple profiles so that the individual may store a set of current settings for multiple media streams. This would allow the individual to very quickly queue up to where the individual left off viewing or hearing in the middle of any number of video and audio streams. A remote control may be various devices and implementations, including, but not limited to, virtual remote control device, controls embedded in the device, or any other controlling mechanism.

The present invention provides convenience in media changing, which becomes especially valuable where there are multiple individuals using the system, such as a family, and where there are multiple devices individuals can choose to space-shift to. Space-shifting is moving a media broadcast from one device to another device. For example, a user may be watching a broadcast on his/her television and then space-shift the broadcast to his/her laptop computer. Or, for example, a broadcast may be space-shifted from a television or computer in one part of the house to a television or computer in another part of the house, such as from the family room to bedroom. Therefore, when an individual is viewing or listening to a media broadcast, that broadcast is already being recorded, so that the if the individual decides to space-shift the media broadcast, the media broadcast may be picked up on the new device from the point where the individual last left off.

The present invention still has value for a single individual using a single device in that the individual may resume his/her media experience right where he/she left off. And if the individual has multiple profiles, the individual can resume any number of different media experiences.

Turning to FIG. 3, FIG. 3 is a block diagram depicting a system, generally designated by reference number 300, for space-shifting media in accordance with an exemplary embodiment of the present invention. System 300 comprises four components, media server 302, user manager 304, device manager 306 and user identifier 308. In an exemplary embodiment, the present invention is implemented in a local network. However, those skilled in the art will recognize that the present invention could be implemented as a remote network or in combination with a remote network or using peer-to-peer technology.

Media server 302 is either a server where all the media resides, or media server 302 is connected to and has the ability to control the devices where the media does reside. Media server 302 may be implemented as a new server added to an existing system or as additional functions on top of existing media servers. Media server 302 records all media for all users as the media is being broadcast. If a user does not desire to save a particular media broadcast, the media is discarded once the broadcast has ceased. In an exemplary embodiment, media server 302 resides on a data processing system with a large amount of storage space. In other exemplary embodiments, media server 302 may be implemented as either a dedicated or distributed device. Media server 302 is networked to all the devices in the system and receives instructions over the network whenever a user identifies himself/herself at a device.

User manager 304 allows individual users to create profiles. The profiles are attached to unique identifiers, or user names, that media server 302 and user identifier 308 use to maintain information and serve media for each individual user. The profile may include custom name information for display on devices, such as the "display" button on some television remotes, showing whose identity is currently being used. User manager 304 also stores the media information for each individual user, including media type, location/file name, time where left off, and media settings, such as volume, brightness, playback options, etc.

In an exemplary embodiment of the present invention, the profiles enable user manager 304 to maintain settings for multiple media streams for each user. This is especially beneficial to those individuals who like to go back and forth at various times watching a movie, a television show, listening to music, etc. For example, if a user were to pause a movie for the evening, that user might watch television and listen to music before going back to the movie because the user prefers to watch movies late at night.

In another exemplary embodiment, user manager 304 includes passwords associated with the profiles. This functionality requires an authentication mechanism in user identifier 308 for each device. This may be useful in a family to prevent unwanted alteration of allowed viewing material.

In an exemplary embodiment, user manager 304 comprises a user interface and a database. The interface may be anything such as an application graphical user interface running on a computer, or a web page, a clickable menu on a television, or a combination thereof. The database may be implemented as part of media server 302 or on a completely different data processing system.

Device manager 306 controls which devices may participate in the system. Since the system will receive commands over the network from these devices, identification of each device is required. In an exemplary embodiment of the present invention, device manager 306 contains a mapping of commands for various devices that implement commands differently. Since media is being streamed, settings may be included in the stream. In an exemplary embodiment, device manager 306 includes controls for each device to adjust things like volume on the device itself.

In an exemplary embodiment of the present invention, device manager 306 is able to queue up requested media, adjust volume for an individual user's settings, and turn on required devices such as the television, sound system, and so forth, with the push of a single button. This implementation may require integration with devices similar to remote controls that can program control of multiple devices. The device manager would receive volume, brightness, and other settings information from the device to be controlled and be able to control it or compensate for it by adjusting the media stream. Some settings may have a modifier depending on which device the media is being space-shifted to. For example, a user may want the brightness automatically increased by a set amount if media is space-shifted from a user's television to a user's notebook computer.

In an exemplary embodiment, device manager 306 comprises a user interface and a database. The interface may be an application graphical user interface running on a computer, a web page, a clickable menu on a television, or a combination thereof. The database may be implemented as part of media server 302 or on a completely different data processing system.

User identifier 308 is a mechanism through which users identify themselves and the profile they wish to use to the system. User identifier 308 should function with all devices in the network. In an exemplary embodiment, user identifier 308 may be implemented at each device as a change to the device itself, such as the features included in the device's remote control or in the device's display and setup settings. In another exemplary embodiment, user identifier 308 may be implemented as a proxy device that sits between the device and media server 302, near the device so that the device may be remotely controlled. In an exemplary embodiment, user identifier 308 is implemented in a universal remote control with buttons for each individual user. In another exemplary embodiment, user identifier 308 may also include an authentication mechanism for some degree of protection for profiles, such as an integrated fingerprint scanner.

FIG. 4 is a flowchart illustrating the operation of space-shifting of media, in accordance with an exemplary embodiment of the present invention. The operation begins when a media server receives user input (step 402). The operation determines if the input is a user logging on (step 404). If a user is not logging on (a no output to step 404), the operation goes directly to step 408. If a user is logging on (a yes output to step 404), the operation retrieves the user profile associated with the user identification (step 406) and then the operation goes to step 408. The operation then determines if there is currently any media broadcasts stored for the user (step 408). If there is a media broadcast stored for the user (a yes output to step 408) the operation asks the user if the user wants to resume broadcasting of the stored media broadcast (step 410). In another exemplary embodiment, all media broadcasts currently saved for the user are listed and the user can select what, if any, media broadcasts to resume broadcasting.

If the user does wish to resume broadcasting a stored media broadcast (a yes output to step 410), the media server determines if the user wants to resume broadcasting at the current device (step 412). If the user does not want to resume broadcasting at the current device (a no output to step 412), the user selects a device, from a list of devices, provided by the media server, on the network on which to resume broadcasting of the stored media broadcast (step 416). If the user does want to resume broadcasting at the current device (a yes output to step 412), the operation resumes broadcasting the stored media broadcast at the current device from the point where the user left off, and any saved media settings, such as volume, brightness and playback options are applied (step 418), and the operation ends. If the user does not want to resume broadcasting a stored media broadcast (a no output to step 410), the normal operation of the current device is resumed (step 414) and the operation ends.

If there is not a media broadcast stored for the user (a no output to step 408), the operation determines if there is media currently playing for the user (step 420). If there is not current media playing for the user (a no output to step 420), the normal operation of the current device is resumed (step 414) and the operation ends. If there is media playing for the user (a yes output to step 420), the operation determines if the user wants to space-shift, or transfer, the media broadcast (step 422). If the user does not wish to space-shift the media broadcast (a no output to step 422), the operation determines if the user wants to save the media broadcast (step 424). If the user does not want to save the media broadcast (a no output to step 424), the media broadcast is not saved, the normal operation of the current device is resumed (step 414) and the operation ends. If the user wants to save the media broadcast (a yes output to step 424), the media broadcast and media settings are saved (step 426) and the operation ends.

If the user does want to transfer the media broadcast (a yes output to step 422), the user selects which device to transfer the media broadcast to from a list of devices on the network provided by the media server (step 428). The media broadcast is transferred to the selected device, including any media settings (step 430) and the operation ends.

The present invention provides convenience in media space-shifting, which becomes especially valuable where there are multiple individuals using the system, such as a family, and where there are multiple devices individuals can choose to space-shift to. The present invention allows an individual to resume hid/her media experience right where he/she had previously left off. Additionally, if the individual has multiple profiles, the individual may resume any number of different media experiences.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for space-shifting a media broadcast program, the method comprising:
   a media server receiving from a user for a user profile a preferred brightness level for a specified computing device of the user, the brightness level for the specified computing device differing from a brightness level of a television of the user, the computing device differing in type from the television;
   subsequently, receiving at the media server a user request to space-shift a media broadcast program which was played in part on the television, and in response, the media server recording a point in the media broadcast program approximately at an end of the part which was played on the television;
   subsequently, the media server receiving another user request to resume play of the media broadcast program on the computing device, and in response, the media server correlating the computing device to the user, correlating the user and the user profile to the other user request, and resuming play of the media broadcast program on the computing device from approximately the point and automatically setting a brightness level of the resumed media broadcast program on the computing device to the preferred brightness level specified in the user profile.

2. The method of claim 1, further comprising:
   a plurality of user profiles associated with a plurality of users, wherein the plurality of profiles are operable to maintain media settings for multiple media streams for each user of the plurality of users.

3. The method of claim 1, wherein the user request is received from a device manager that is operable to send the at least some of the plurality of media settings to the device.

4. The method of claim 3, wherein the at least some of the media setting are sent to the device when streaming the media broadcast program to the device.

5. A media server computer for space-shifting media broadcast programs, the media server computer comprising:
   one or more processors, one or more computer-readable memories, one or more computer-readable storage devices, and program instructions stored on the one or more storage devices for execution by the one or more processors via at least one of the one or more memories, the program instructions comprising:

first program instructions to receive from a user for a user profile a preferred brightness level for a specified computing device of the user, the brightness level for the specified computing device differing from a brightness level of a television of the user, the computing device differing in type from the television;

second program instructions to subsequently receive at the media server a user request to space-shift a media broadcast program which was played in part on the television, and in response, the media server recording a point in the media broadcast program approximately at an end of the part which was played on the television; and third program instructions to subsequently receive at the media server another user request to resume play of the media broadcast program on the computing device, and in response, the media server correlating the computing device to the user, correlating the user and the user profile to the other user request, and resuming play of the media broadcast program on the computing device from approximately the point and automatically setting a brightness level of the resumed media broadcast program on the computing device to the preferred brightness level specified in the user profile.

6. The system of claim 5, further comprising a device manager coupled to the media server, wherein the device manager is operable for managing a plurality of devices included in a network, wherein the media server controls other devices that store at least some of the media broadcast programs, wherein the device manager controls a volume and brightness on the computing device based on a given user profile of the user profiles that is associated with the user who initiated the request.

7. The system of claim 6, wherein the device manager includes media setting controls for each device of the plurality of devices.

8. The system of claim 6, wherein the device manager applies a modifier to a plurality of media settings, depending on a particular device of the plurality of devices that the media broadcast program is being sent to, in order to map a given control signal to a compatible control signal that is compatible with the particular device.

9. The system of claim 6 further comprising:
a user operable control device comprising the device manager.

10. The system of claim 9 wherein the user operable control device is operable to control at least one of the plurality of devices and comprises a dedicated control button for each of the plurality of users.

11. The system of claim 5, further comprising a user manager coupled to the media server, wherein the user manager is operable for creating and managing user identifications and user profiles for a plurality of users on a network including a plurality of devices, wherein the user manager comprises a graphical user interface and a database that is operable for managing the user identifications and the user profiles for the plurality of users.

12. The system of claim 11, further comprising a device manager coupled to the media server, wherein the device manager is operable for managing the plurality of devices, wherein the device manager comprises a graphical user interface and a database;
wherein the device manager controls which devices participate in the system;
wherein the device manager queues requested media, adjusts volume for an individual user's settings, and turns on the computing device; and
wherein the device manager adjusts volume and brightness by adjusting settings embedded in the media broadcast program sent to the computing device.

13. The system of claim 5, wherein the user has a plurality of profiles, and wherein the user selects the computing device from a list that is presented to the user based on the plurality of profiles.

* * * * *